(12) United States Patent
Fuge et al.

(10) Patent No.: US 9,091,332 B2
(45) Date of Patent: Jul. 28, 2015

(54) FLOATING DRIVE SHAFT BETWEEN AN ACTUATING ASSEMBLY AND LINKAGE STRUCTURE OF A DEAD TANK BREAKER

(71) Applicant: ABB Technology AG, Zurich (CH)

(72) Inventors: Jonathan Fuge, Farmington, PA (US); Beth Dahm, Pittsburgh, PA (US); Matthew Cuppett, Uniontown, PA (US)

(73) Assignee: ABB Technology AG, Zurich (CH)

( * ) Notice: Subject to any disclaimer, the term of this patent is extended or adjusted under 35 U.S.C. 154(b) by 294 days.

(21) Appl. No.: 13/851,141

(22) Filed: Mar. 27, 2013

(65) Prior Publication Data

US 2013/0269458 A1    Oct. 17, 2013

Related U.S. Application Data

(60) Provisional application No. 61/623,599, filed on Apr. 13, 2012.

(51) Int. Cl.
| | | |
|---|---|---|
| *H01H 33/56* | (2006.01) | |
| *H01H 33/42* | (2006.01) | |
| *F16H 21/12* | (2006.01) | |
| *H01H 11/00* | (2006.01) | |
| *H01H 33/02* | (2006.01) | |
| H01H 3/40 | (2006.01) | |
| H01H 3/58 | (2006.01) | |

(52) U.S. Cl.
CPC .............. *F16H 21/12* (2013.01); *H01H 11/00* (2013.01); *H01H 33/022* (2013.01); *H01H 33/42* (2013.01); *H01H 33/565* (2013.01); H01H 3/40 (2013.01); H01H 3/58 (2013.01); *Y10T 29/49105* (2013.01); *Y10T 74/1836* (2013.01); *Y10T 74/18384* (2013.01)

(58) Field of Classification Search
CPC ..... H01H 33/02; H01H 33/022; H01H 33/42; H01H 33/56; H01H 33/565
USPC ........ 218/7, 13, 14, 153, 154; 200/17 R, 48 R
See application file for complete search history.

(56) References Cited

U.S. PATENT DOCUMENTS

| | | | | |
|---|---|---|---|---|
| 4,814,560 | A  * | 3/1989  | Akesson ......................... | 218/84 |
| 6,380,504 | B1 * | 4/2002  | Klocke et al. ................ | 218/153 |
| 8,338,727 | B2 * | 12/2012 | Wolfe ......................... | 200/17 R |
| 2010/0270136 | A1 * | 10/2010 | Wolfe ......................... | 200/17 R |

FOREIGN PATENT DOCUMENTS

| | | |
|---|---|---|
| EP | 0094858 A1 | 11/1983 |
| EP | 0405253 A1 | 1/1991 |
| EP | 0663675 A1 | 7/1995 |

OTHER PUBLICATIONS

PCT Search Report & Written Opinion in PCT/US2013/033958 dated Jul. 10, 2013.

* cited by examiner

*Primary Examiner* — Amy Cohen Johnson
*Assistant Examiner* — Marina Fishman
(74) *Attorney, Agent, or Firm* — Manelli Selter PLLC; Edward J. Stemberger

(57) ABSTRACT

Drive structure is provided for connection between an actuating assembly of a circuit breaker and linkage structure for opening and closing a movable electrical contact disposed in a volume of insulating material in a pole assembly. The drive structure includes a drive lever constructed and arranged to connect with the at least one actuating assembly. A drive shaft has first and second ends, with the first end being removably coupled to the drive lever so that rotation of the drive shaft rotates the drive lever. Seal structure is disposed between the drive lever and the actuating assembly such that the drive shaft can be removed from the drive lever without disrupting the volume of insulating material.

15 Claims, 2 Drawing Sheets

FLOATING DRIVE SHAFT BETWEEN AN ACTUATING ASSEMBLY AND LINKAGE STRUCTURE OF A DEAD TANK BREAKER

FIELD

The invention relates to high voltage, dead tank circuit breakers and, more particularly, to a floating drive shaft that can be removed between an actuating assembly and linkage structure without disturbing a gas volume in a pole assembly of the circuit breaker.

BACKGROUND

Circuit breakers are commonly found in substations and are operable to selectively open and close electrical connections. Typical dead tank circuit breakers have pole assemblies that include first and second electrical conductors in associated bushings. As is known in the art, electrical power lines are coupled to first and second electrical conductors, and the circuit breaker selectively opens or closes the electrical connection there-between. A bell crank or other actuating assembly is associated with a respective pole assembly. The bell cranks are interconnected by a gang-style rotary or push-pull linkage so that all three poles assemblies are actuated at the same time by a single operating mechanism.

In these conventional dead tank circuit breakers, a drive shaft coupling the linkage to the bell cranks is part of the gas seal at each pole assembly, or a single drive shaft passes through all poles assemblies. Thus, the drive shaft(s) cannot be installed or removed for servicing without the time-consuming removal or reclaiming the insulating gas from the pole assemblies.

Thus, there is a need to provide a drive shaft for a circuit breaker that can be installed or removed for servicing without the need to remove or reclaim the insulating gas from an associated pole assembly.

SUMMARY

An object of the invention is to fulfill the need referred to above. In accordance with the principles of the present invention, this objective is obtained by providing drive structure for connection between an actuating assembly of a circuit breaker and linkage structure for opening and closing a movable electrical contact disposed in a volume of insulating material in a pole assembly. The drive structure includes a drive lever constructed and arranged to connect with the actuating assembly. A drive shaft has first and second ends, with the first end being removably coupled to the drive lever so that rotation of the drive shaft rotates the drive lever. Seal structure is constructed and arranged between the drive lever and the actuating assembly such that the drive shaft can be removed from the drive lever without disrupting the volume of insulating material.

In accordance with another aspect of the disclosed embodiment, a method is provided for removing a drive shaft with respect to an actuating assembly coupled with a movable electrical contact. The contact is disposed in a volume of insulating material in a pole assembly of a circuit breaker. The method including the steps of coupling a drive lever with the actuating assembly; removably coupling the drive shaft to the drive lever so that rotation of the drive shaft rotates the drive lever; providing seal structure between the drive lever and the actuating assembly to seal the volume of insulating material; and removing the drive shaft from the drive lever without disrupting the volume of insulating material.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
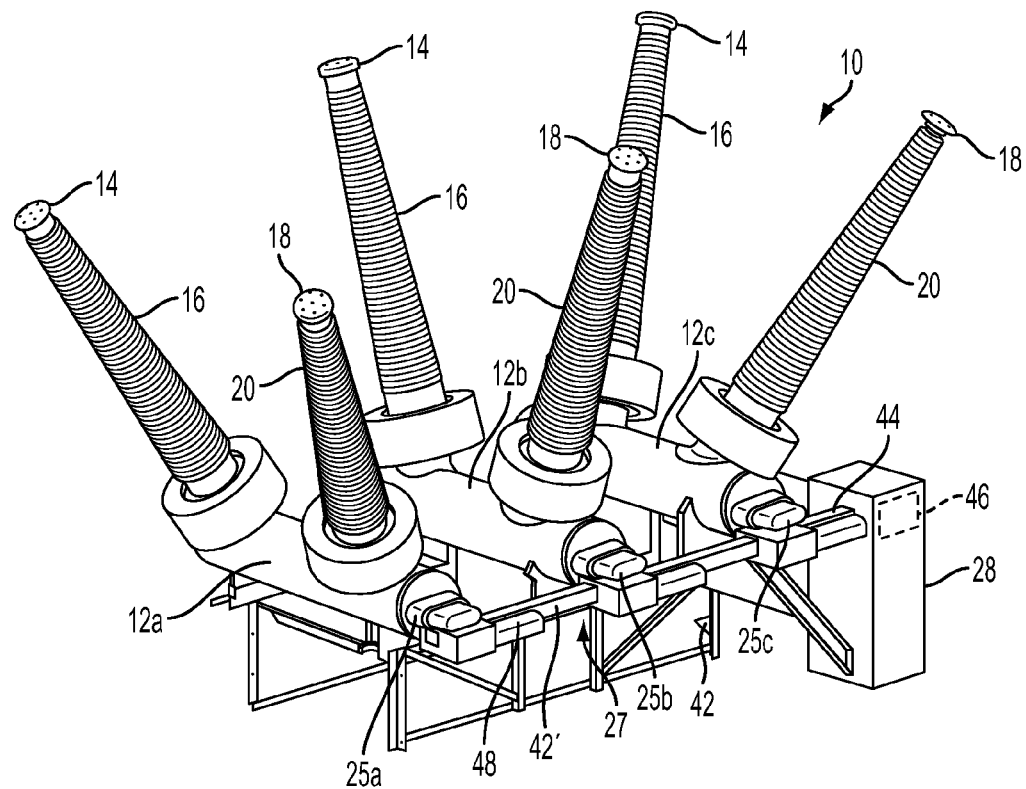
FIG. 1 is a front view of a high voltage, three pole operated dead tank circuit breaker having bell crank assemblies and interphase linkage structure in accordance with an embodiment.

With reference to FIG. 1, a circuit breaker is shown, generally indicated at 10. Circuit breaker 10 is preferably a three phase circuit breaker and thus includes three pole assemblies 12a, 12b and 12c. Each pole assembly 12 includes a first electrical conductor 14 carried in a first bushing 16 and a second electrical conductor 18 carried in a second bushing 20. Electrical power lines are coupled to the first and second electrical conductors 14 and 18, and the circuit breaker 10 selectively opens or closes the electrical connection there-between.

Figure 2:
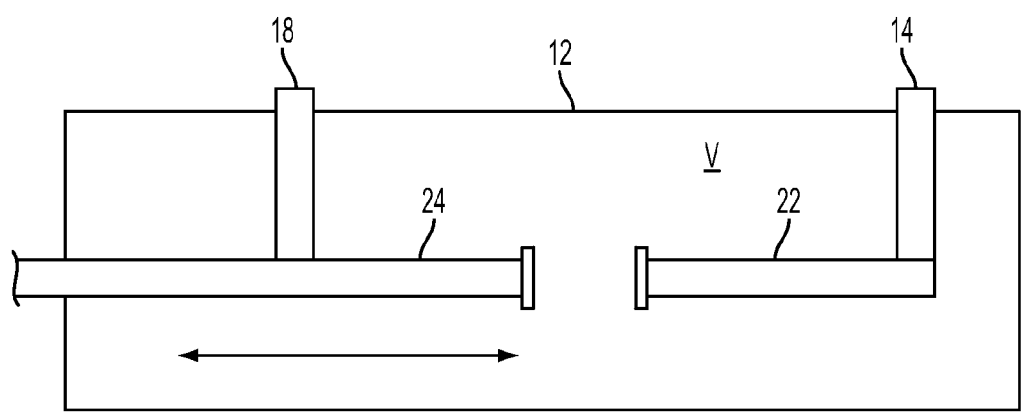
FIG. 2 is a schematic view of an interior of a breaker pole of the circuit breaker of FIG. 1, wherein the electrical contacts are open.

With reference to FIG. 2, a simplified view of an interior of pole assembly 12 is shown, wherein first electrical conductor 14 is electrically connected to a stationary contact 22 which is immovably secured within pole assembly 12. Second electrical conductor 18 is electrically connected to a movable contact 24 which is carried within pole assembly 12 in a manner allowing longitudinal movement therein. Thus, in a first position, the movable contact 24 may be positioned to break the electrical connection between first the electrical conductor 14 and second electrical conductor 18 (FIG. 2). In a second position, the movable contact 24 may be brought into contact with stationary contact 22 to electrically connect the first electrical conductor 14 and the second electrical conductor 18. The interior space of pole assemblies 12 are sealed and generally adapted to minimize arcing between stationary contact 22 and movable contact 24. The interior volume V of pole assembly 12 may be filled with dielectric mediums that include SF6, dry air, dry nitrogen, $CO_2$ or oil. Alternatively, a vacuum-type interrupter could be employed within the tank volume surrounded by dielectric mediums mentioned.

With reference to FIG. 1, an actuating assembly, preferably in the form of a bell crank assembly 25a, 25b, 25c, is coupled with the movable electrical contact 24 of a respective pole assembly 12a, 12b and 12c for opening and closing the electrical connection between conductors 14 and 18. The bell crank assemblies are conventional and can be of the type disclosed in U.S. Patent Application Publication No. 20100270136A1, the content of which is hereby incorporated by reference into this specification. The bell crank assemblies are preferably interconnected by a gang-style, non-rotary, pull-pull linkage structure, generally indicated at 27, so that all three poles assemblies are actuated at the same time by a single, electrically controlled operating mechanism 28.

Figure 3:
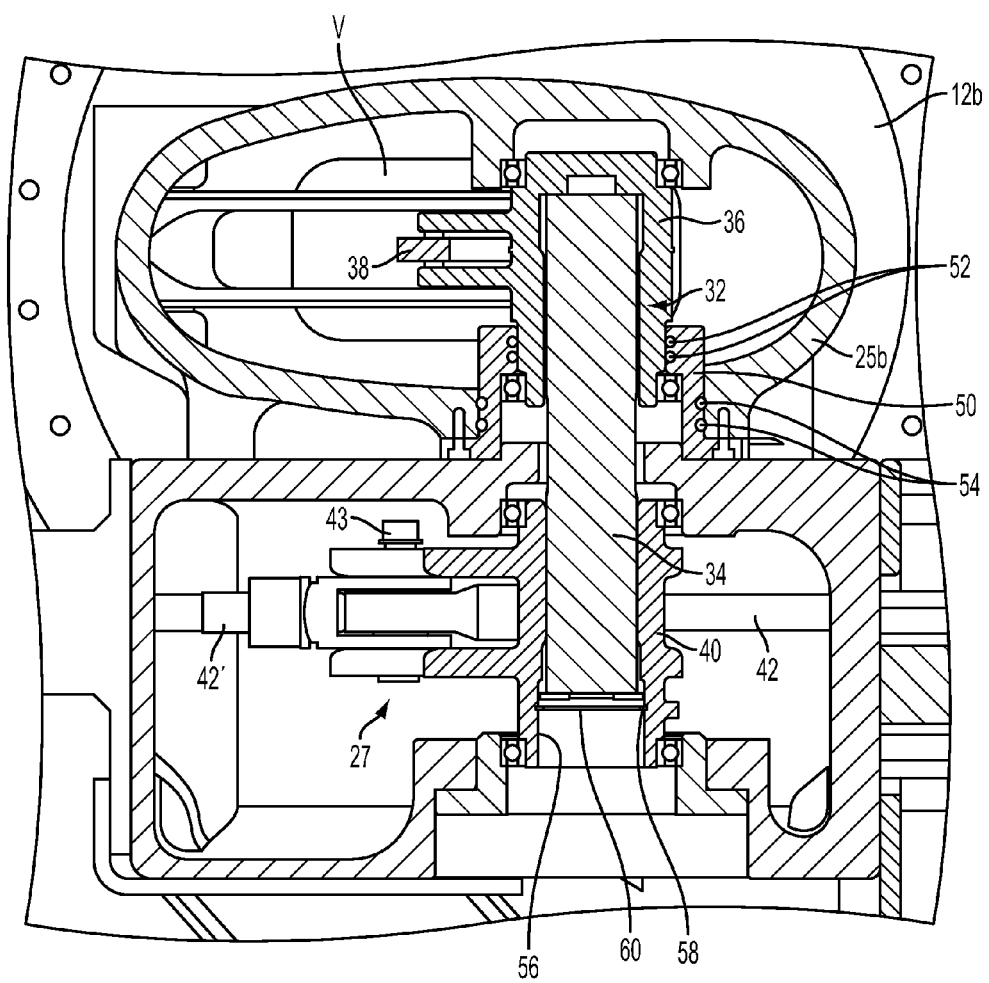
FIG. 3 is a partial sectional view of a drive structure coupled between a bell crank assembly and the linkage structure at a pole assembly of the circuit breaker of FIG. 1.

With reference to FIGS. 1 and 3, the linkage structure 27 includes a drive structure, generally indicated at 32, coupled with a respective bell crank assembly 25a, 25b and 25c for opening and closing the electrical connection at the associated pole assembly (e.g., 12b in FIG. 3). In particular and as best shown in FIG. 3, each drive structure 32 includes a drive shaft 34 and a drive lever 36 coupled to an end of the drive shaft 34 for rotation with the drive shaft 34. The drive shaft 34 preferably includes splines or is keyed for removable connection with the drive lever 36. The drive lever 36 is coupled via a crank link 38 with the associated bell crank assembly (e.g., bell crank assembly 25b in FIG. 3). A linkage lever 40 is coupled to the other end of the drive shaft 34 for rotation with the drive shaft 34. Linkage lever 40 is coupled to interphase connection rods 42, 42' of the linkage structure 27 via pin 43 so that linear motion of the connection rods causes rotation of the linkage lever 40 and thus the drive shaft 34. Rod 42 is connected to a linkage lever 40 associated with bell crank assembly 25c and rod 42' is connected to a linkage lever 40 associated with bell crank assembly 25a. Thus, for three pole circuit breaker, three drive structures 32 are provided, interconnected by two connection rods 42, 42'. A rod 44 (FIG. 1) is coupled to the drive structure 32 associated with crank assembly 25c and to a close spring 46 in the operating mechanism 28 for closing the circuit breaker 10. Since the drive structures 32 are interconnected via the connection rods 42, 42' and rod 44, the drive structures move simultaneously upon actuating of the mechanism 28 to operate the bell crank assemblies simultaneously.

As shown in FIG. 1, at least one open spring 48 is coupled to a drive structure 32 to provide the force opposing the close spring 46 for opening the electrical conductors 14, 18 of the circuit breaker 10. In the embodiment, three open springs 48 are provided, one for each pole assembly 12 with the total spring force of the open springs 48 opposing the spring force of the close spring 46. However, instead of providing three separate open springs 48, a single open spring 48 can be provided, for example, at only pole assembly 12a that opposes the force of the close spring 46.

The embodiment of FIG. 3 advantageously uses a "floating shaft" method of connecting a linkage system to an interrupter without disturbing the volume V of the breaker pole assembly containing the interrupter. In the embodiment, this floating shaft is achieved by providing the drive lever 36 as part of the insulating material seal. Conventional assemblies use only a shaft instead of the drive lever which eliminates the possibility of shaft removal without removing insulating material in volume V or disassembly of the assembly that encases volume V. As shown in FIG. 3, the complete insulating material seal includes the drive lever 36, the bell-crank assembly 25b, a bearing structure 50, and seal structure including first seals 52 between the drive lever 36 and the bearing structure 50, and second seals 54 between the bearing structure 50 and the bell crank assembly 25b. The seals 52 and 54 are preferably of elastomer material such as rubber O-rings for sealing while permitting rotation of the drive lever 36 with respect to the bearing structure 50 upon rotation of the drive shaft 34. The bearing structure 50, seals 52 and 54, and linkage lever 40 can be considered to be part of the drive structure 32.

The term "floating shaft" arises due to the fact each drive shaft 34 is neither rigidly connected to the associated bell-crank assembly (e.g., 25b) nor to the linkage structure 27. The drive shaft 34 is held in place in a bore 56 of the linkage lever 40 by retaining structure such as, for example, a snap ring 58 engaged in a groove 60 in a wall defining the bore 56, or any other quick release device. When the snap ring 58 is removed or disassociated with the bore 56, the drive shaft 34 can be completely removed through the bore 56 for servicing of any kind. Any retaining structure can be used to secure and then remove the drive shaft 34. For example, the bore 56 of the linkage lever 40 can be threaded and a threaded end cap can be engaged therewith to retain the drive shaft 34.

Thus, the mechanical connection between the linkage structure 27 and the bell-crank assembly 25b does not involve the drive shaft 34. Such an arrangement protects splines of the drive shaft 34 during servicing because they will not be the first interface to make contact between the linkage structure 27 and bell crank assembly 25b during assembly. Furthermore, if the drive shaft 34 was rigidly connected to the linkage structure 27 or the bell-crank assembly 25b, assembly or disassembly could put unwanted stresses on the drive shaft 34 resulting in damage.

This embodiment allows each drive shaft 34 to be installed or removed individually for servicing without the need to remove/reclaim the insulating material from the volume V of the associated pole assembly, which is a timely process. Furthermore, since a drive shaft 34 only connects to an associated pole assembly of the breaker 10, all other pole assemblies remain connected to the linkage structure by their associated drive shafts 34 and levers. Therefore, if servicing, such as pole assembly replacement, is needed, a new pole assembly can be added to the breaker at shipping pressure without any need to open the insulating material volume to damaging particles. Servicing includes maintenance, repair work, shipping, and any other act in which it would require or benefit from removal of the drive shaft 34.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A drive structure for connection between an actuating assembly of a circuit breaker and a linkage structure for opening and closing a movable electrical contact disposed in a volume of insulating material in a pole assembly, the drive structure comprising:
   a drive lever constructed and arranged to connect with the actuating assembly,
   a drive shaft having first and second ends, with the first end being removably coupled to the drive lever so that rotation of the drive shaft rotates the drive lever,
   a linkage lever coupled to the second end of the drive shaft,
   at least one connection rod, as part of the linkage structure, coupled with the linkage lever so that the connection rod is generally transverse with respect to the drive shaft, and
   a seal structure between the drive lever and the actuating assembly such that the drive shaft can be removed from the drive lever without disrupting the volume of insulating material.

2. The drive structure of claim 1, wherein the linkage lever includes a bore there-through, the drive shaft extending into the bore so that rotation of the drive shaft rotates the linkage lever, retaining structure being removably associated with the bore for retaining the drive shaft in the bore, and once the retaining structure is disassociated from the bore, the drive shaft is constructed and arranged to be removed from the drive lever through the bore.

3. The drive structure of claim 2, wherein the retaining structure is a snap ring constructed and arranged to engage a groove in a wall defining the bore.

4. A circuit breaker comprising the drive structure of claim 1, including the actuating assembly and the associated pole assembly, and further comprising bearing structure between the actuating assembly and drive lever, wherein the sealing structure includes a first seal between the actuating assembly and the bearing structure and a second seal between the bearing structure and the drive lever to prevent the insulating material from escaping from the volume.

5. The circuit breaker of claim 4, wherein the first and second seals are elastomer seals.

6. The circuit breaker of claim 4, wherein the insulating material is a dielectric medium that includes SF6, dry air, dry nitrogen, $CO_2$ or oil.

7. The circuit breaker of claim 4, wherein the actuating assembly is a bell crank assembly and the drive lever is coupled to the bell crank assembly via a crank lever.

8. The circuit breaker of claim 7, in further combination with the linkage structure, the linkage structure including at least one connection rod coupled with the linkage lever so that linear movement of the connection rod rotates the linkage lever and thus the drive shaft and drive lever, with the crank lever causing opening or closing of the movable electrical contact.

9. The circuit breaker of claim 8, wherein the circuit breaker is a high voltage, dead tank circuit breaker having three pole assemblies and a bell crank assembly coupled with a movable electrical contact of each pole assembly, wherein:
the drive lever is coupled with each bell crank assembly and is coupled to an associated drive shaft, with the drive shaft being coupled to an associated linkage lever,
two connection rods interconnect the linkage levers, and
a rod is coupled between one of the linkage levers and is constructed and arranged to connect with an operating mechanism so that the bell crank assemblies can be operated simultaneously to open or close the movable electrical contact of each pole assembly, with each drive shaft being constructed and arranged to be removed individually from its associated drive lever.

10. A method of removing a drive shaft with respect to an actuating assembly coupled with a movable electrical contact, the contact being disposed in a volume of insulating material in a pole assembly of a circuit breaker, the method including the steps of:
coupling a drive lever with the actuating assembly,
removably coupling a first end of the drive shaft to the drive lever so that rotation of the drive shaft rotates the drive lever,
coupling a linkage lever to a second end of the drive shaft so that rotation of the drive shaft rotates the linkage lever,
coupling at least one connection rod with the linkage lever so that the connection rod is generally transverse with respect to the drive shaft,
providing seal structure between the drive lever and the actuating assembly to seal the volume of insulating material, and
removing the drive shaft from the drive lever without disrupting the volume of insulating material.

11. The method of claim 10,
wherein the linkage lever includes a bore there-through, the drive shaft extending into the bore, and wherein the method further comprising the steps:
providing retaining structure associated with the bore to retain the drive shaft in the bore,
wherein the removing step includes disassociating the retaining structure from the bore and removing the drive shaft from the drive lever through the bore.

12. The method of claim 11, wherein the retaining structure is a snap ring engage a groove in a wall defining the bore, wherein the removing step includes removing the snap ring from the bore.

13. The method of claim 10, wherein the actuating assembly is a bell crank assembly and the drive lever is coupled to the bell crank assembly via crank link.

14. The method of claim 10, wherein the method further provides bearing structure between the actuating assembly and the drive lever, wherein the step of providing the sealing structure provides a first seal between the actuating assembly and the bearing structure and a second seal between the bearing structure and the drive lever.

15. The method of claim 11, wherein the circuit breaker is a high voltage, dead tank circuit breaker having three pole assemblies and an actuating assembly coupled with the movable electrical contact of each pole assembly, wherein a linkage lever is coupled with each bell crank assembly, the method further comprising:
interconnecting the linkage levers by two connection rods, and
coupling a rod between one of the linkage levers and an operating mechanism so that the actuating assemblies can be operated simultaneously to open or close the movable electrical contact of each pole assembly.

* * * * *